US006822683B1

(12) United States Patent
Torikai

(10) Patent No.: US 6,822,683 B1
(45) Date of Patent: Nov. 23, 2004

(54) IMAGE SENSING APPARATUS AND METHOD OF CONTROLLING OPERATION THEREOF

(75) Inventor: Toru Torikai, Asaka (JP)

(73) Assignee: Fuji Photo Film Co., LTD, Kanagawa (JP)

( * ) Notice: Subject to any disclaimer, the term of this patent is extended or adjusted under 35 U.S.C. 154(b) by 0 days.

(21) Appl. No.: 09/426,133

(22) Filed: Oct. 25, 1999

(30) Foreign Application Priority Data

Oct. 30, 1998 (JP) .................................... 10-310294

(51) Int. Cl.[7] ..................... H04N 5/222; H04N 5/235; H04N 9/04
(52) U.S. Cl. .................. 348/333.13; 348/207.99; 348/372; 348/221.1
(58) Field of Search ................. 348/207.99, 222.1, 348/333.01, 333.13, 375, 366, 372; 396/373, 374

(56) References Cited

U.S. PATENT DOCUMENTS

| | | | | |
|---|---|---|---|---|
| 5,296,889 A | * | 3/1994 | Imai | 396/48 |
| 5,637,871 A | * | 6/1997 | Piety et al. | 250/330 |
| 5,699,115 A | * | 12/1997 | Hiraki et al. | 348/333.13 |
| 5,729,289 A | * | 3/1998 | Etoh | 348/333.02 |
| 5,949,484 A | * | 9/1999 | Nakaya et al. | 348/384.1 |
| 6,034,750 A | * | 3/2000 | Rai et al. | 349/57 |
| 6,198,880 B1 | * | 3/2001 | Hosaka et al. | 396/6 |
| 6,421,506 B1 | * | 7/2002 | Maruyama | 396/303 |
| 6,441,854 B2 | * | 8/2002 | Fellegara et al. | 348/333.13 |
| 2001/0050716 A1 | * | 12/2001 | Hashimoto et al. | 348/333.01 |
| 2003/0043273 A1 | * | 3/2003 | Suzuki | 348/371 |

* cited by examiner

*Primary Examiner*—Andrew Christensen
*Assistant Examiner*—Lin Ye
(74) *Attorney, Agent, or Firm*—Birch, Stewart, Kolasch & Birch, LLP

(57) ABSTRACT

A digital camera is provided with a reflecting/transmitting-type liquid crystal display unit that includes a backlighting device for controlling whether backlighting is turned on or off. The shutter-release button of the camera is provided with a touch sensor. Backlighting is turned on when the touch sensor is touched. Thus, backlighting is turned on only when a subject is photographed, thereby making it possible to conserve power.

15 Claims, 2 Drawing Sheets

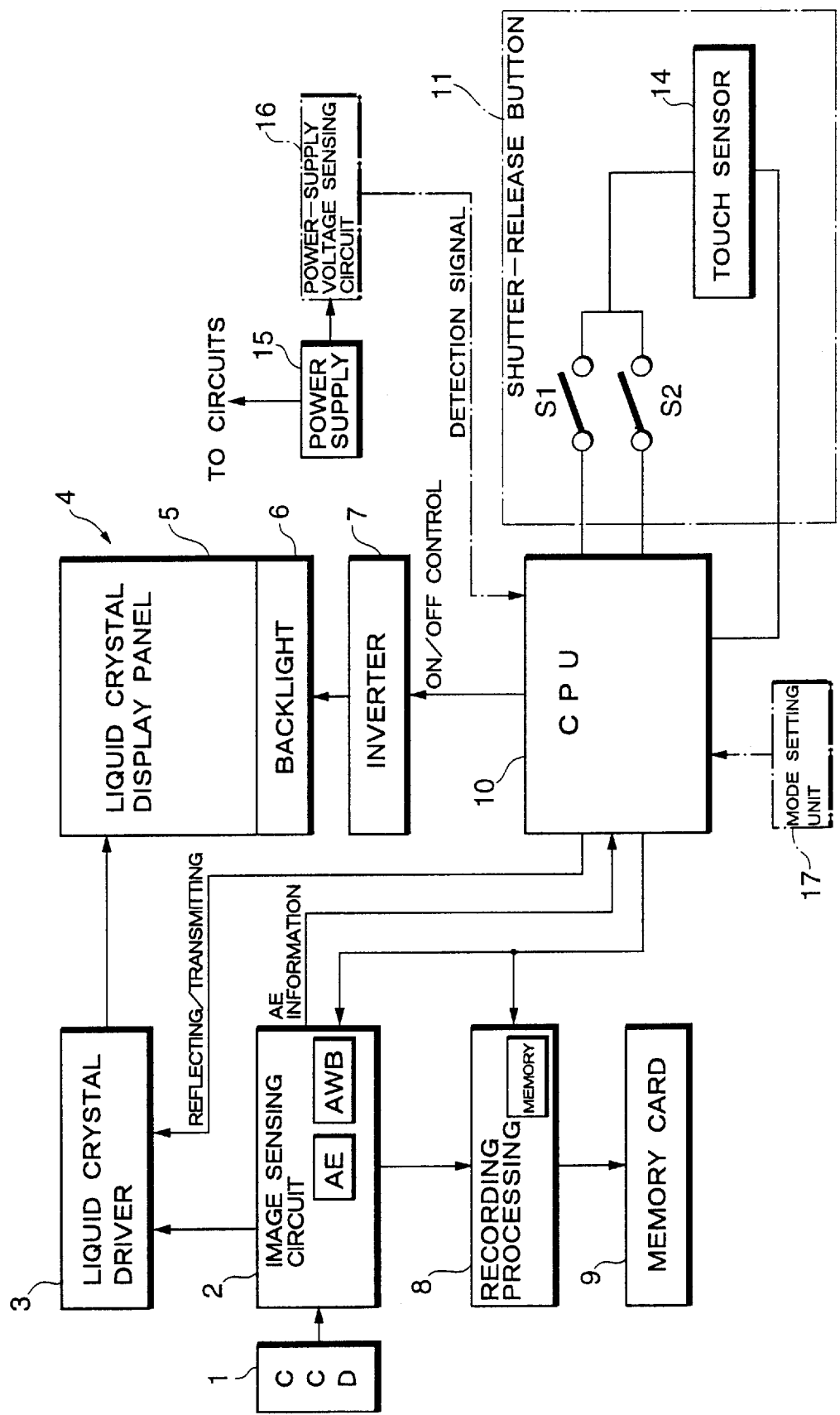

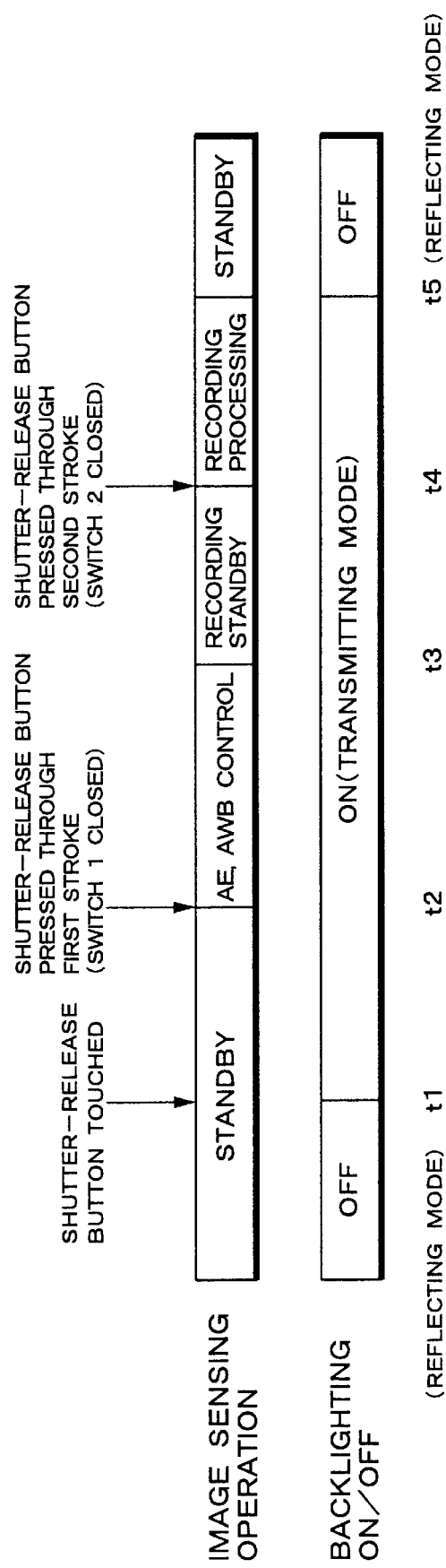

IMAGE SENSING APPARATUS AND METHOD OF CONTROLLING OPERATION THEREOF

BACKGROUND OF THE INVENTION

1. Field of the Invention

This invention relates to an image sensing apparatus for sensing an image of a subject and recording image data, which represents the image of the subject, on a recording medium. The invention relates further to a method of controlling an operation of this digital camera.

2. Description of the Related Art

An image sensing apparatus is often provided with a liquid crystal display device for displaying the image of a subject in order that the user may check the subject whose image is sensed. Liquid crystal display devices may employ a transmitting-type liquid crystal display panel or a reflecting-type liquid crystal display panel.

A transmitting-type liquid crystal display panel typically has a backlighting device provided on an underside of the liquid crystal display panel. The backlighting device is used to illuminate the liquid crystal display panel from its underside.

In a typical reflecting-type liquid crystal display panel, ambient light strikes a top side of the panel to illuminate the same. Though the reflecting-type liquid crystal display panel makes it possible to conserve electric power, there are occasions where an amount of light sufficient for illuminating the liquid crystal display panel from the top side cannot be obtained when the camera shoots a subject indoors. As a consequence, the image displayed on the liquid crystal device may be difficult to see.

SUMMARY OF THE INVENTION

Accordingly, an object of the present invention is to make it possible to conserve power and to facilitate the viewing of an image displayed on a liquid crystal display device even when photography is performed indoors.

According to an embodiment of the present invention, the foregoing object is attained by providing an image sensing apparatus comprising: a shutter-release button; an image sensing device, responsive to pressing of the shutter-release button, for sensing an image of a subject and outputting image data representing the image of the subject; a reflecting/transmitting-type liquid crystal display unit, which includes a backlighting device in which backlighting can be turned on and off, for displaying the image represented by the image data output from the image sensing device; a touch discriminating device for determining whether the shutter-release button has been touched; and a backlight emission controller for turning on the backlighting device in response to a determination by the touch discriminating device that the shutter-release button has been touched.

Another embodiment of the present invention provides a method of controlling the operation of the above-described image sensing apparatus. Specifically, the embodiment provides a method of controlling operation of an image sensing apparatus having a shutter-release button, in which the image of a subject is sensed in response to pressing of the shutter-release button, the method comprising the steps of: providing a reflecting/transmitting-type liquid crystal display unit, which includes a backlighting device in which backlighting can be turned off, for displaying an image represented by image data obtained by sensing the image of the subject; determining whether the shutter-release button has been touched; and turning on the backlighting device in response to a determination that the shutter-release button has been touched.

In accordance with one or more embodiments of the present invention, an image sensing apparatus (a digital camera, a personal digital assistants having a digital camera and so on) is provided with a reflecting/transmitting-type liquid crystal display unit that includes a backlighting device in which backlighting can be turned on and off.

When the shutter-release button is touched by the user, the backlighting device of the reflecting/transmitting-type liquid crystal display unit is turned on. The underside of the liquid crystal display panel constituting the reflecting/transmitting-type liquid crystal display unit is illuminated by the backlighting device. The backlighting device is turned on when the shutter-release button is touched by the user and is not turned on when the shutter-release button is not touched by the user. Since the backlighting device is turned on only when the image of a subject is actually sensed, power can be conserved.

If the shutter-release button is touched when a subject is to be shot, the backlighting of the liquid crystal display panel is turned on. As a result, the image displayed by the liquid crystal display unit is easy to see. In a reflecting/transmitting-type liquid crystal display unit, ambient light strikes the top side of the liquid crystal display panel. The image of the subject displayed by the liquid crystal display unit is easy to see outdoors as well.

The digital camera may further be provided with a shooting-location discriminating device (shooting-location discriminating means) for determining whether shooting is taking place outdoors or indoors. In this case the backlight emission controller turns on the backlighting device in response to a determination by the shooting-location discriminating device that shooting is taking place indoors and, moreover, in response to a determination by the touch discriminating device that the shutter-release button has been touched.

If the shutter-release button is touched when shooting is taking place indoors, the backlighting device is turned on and makes it easy to see the image of the subject displayed by the liquid crystal display unit. When it is determined that shooting is taking place outdoors, the backlighting device will not be turned on regardless of whether or not the shutter-release button is touched. This makes it possible to conserve power. Since a sufficient amount of ambient light strikes the liquid crystal display panel when the digital camera is used outdoors, the image of the subject can be viewed with ease even through the backlighting device is not turned on.

The image sensing apparatus, such as the digital camera, may further be provided with a power-supply voltage sensing circuit, wherein the determination by the touch discriminating device may be made in response to the power-supply voltage sensing circuit sensing that power-supply voltage has fallen below a fixed voltage.

In an instance where the power-supply voltage falls below the fixed level, the backlighting device is turned on when a subject is photographed. This makes it possible to conserve power.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram showing the electrical construction of an image sensing apparatus according to an embodiment of the present invention; and FIG. 2 is a time chart illustrating operation timing when photography is performed using the image sensing apparatus.

DESCRIPTION OF THE PREFERRED EMBODIMENT

A preferred embodiment of the present invention will now be described with reference to the drawings.

FIG. 1 is a block diagram showing the electrical construction of an image sensing apparatus, such as a digital camera, according to an embodiment of the present invention.

The overall operation of the digital camera is controlled by a CPU 10. The digital camera has a power supply 15 by which power is supplied to each of the circuits of the camera.

The digital camera is provided with a shutter-release button 11, which may be a two-stroke type. A switch S1 is closed by pressing the shutter-release button 11 by an amount equivalent to a first stroke, and a switch S2 is closed by pressing the shutter-release button 11 by an amount equivalent to a second stroke. A signal representing the pressing of the shutter-release button 11 is input to the CPU 10.

A touch sensor 14 is formed on the surface of the shutter-release button 11. When the user touches the touch sensor 14, the latter supplies the CPU 10 with a signal indicating that the shutter-release button 11 has been touched.

The image of a subject is sensed by a CCD 1, which outputs image data representing the image of the subject. The image data enters an image sensing circuit 2, which includes an AE (Automatic Exposure) circuit and an AWB (Automatic White Balance) circuit. Image data that has entered the image sensing circuit 2 is subjected to a level adjustment in the AE circuit. AE information used in the level adjustment is applied to the CPU 10 which, on the basis of the AE information, determines whether the photography is being performed indoors or outdoors. The image data is further subjected to a color-balance adjustment in the AWB circuit. The image data is stored in the memory of a recording processing circuit 8 as necessary.

The digital camera includes a liquid crystal display unit 4, which in turn includes a liquid crystal display panel 5 and a backlighting device 6. The underside of the liquid crystal display panel 5 can be illuminated by light using the backlighting device 6. The liquid crystal display unit 4 is of the reflecting/transmitting type, in which an image being displayed by the liquid crystal display unit 4 can be seen owing to ambient light striking the top side of the liquid crystal display panel 5 (this mode shall be referred to as the "reflecting mode") and as the result of light illuminating the liquid crystal display panel 5 from the underside thereof (this mode shall be referred to as the "transmitting mode"). As will be described later, the liquid crystal display unit 4 is in the reflecting mode until the touch sensor 14 of the shutter-release button 11 is touched and is placed in the transmitting mode when the touch sensor 14 of the shutter-release button 11 is touched.

The liquid crystal display unit 4 is provided on the back of the case housing the digital camera. When a power-supply switch (not shown) of the digital camera is closed, the image of a subject is sensed and image data representing the image of the subject is obtained. The image of the subject represented by the image data is displayed on the liquid crystal display unit 4. While observing the image of the subject displayed on the liquid crystal display unit 4, the user is capable of deciding the camera angle and of taking a picture. A switch for turning the liquid crystal display unit 4 on and off may be provided, with the image of the subject being displayed on the liquid crystal display unit 4 when the switch is closed. In this case the digital camera would be provided with an optical viewfinder as a matter of course.

The backlighting device 6 is turned on and off under the control of an inverter 7, which is controlled by the CPU 10.

The digital camera further includes a liquid crystal driver 3 for driving the liquid crystal display unit 4. Image data output from the image sensing circuit 2 is applied to the liquid crystal driver 3. The liquid crystal display unit 4 is driven by the liquid crystal driver 3 so that the image represented by the image data obtained by image sensing is displayed on the liquid crystal display panel 5 of the liquid crystal display unit 4.

Image data that has been processed by the image sensing circuit 2 is recorded in the memory of the recording processing circuit 8 when the shutter-release button 11 is pressed by an amount equivalent to the second stroke. The recording processing circuit 8 executes recording processing such as data compression and outputs image data that is applied to a memory card 9. Image data obtained by image sensing is thus recorded on the memory card 9.

FIG. 2 is a time chart illustrating operation timing when photography is performed using the digital camera.

When the shutter-release button 11 is not being touched, the image sensing operation of the digital camera is on standby. The backlighting device 6 of the liquid crystal display unit 4 is off (i.e., the reflecting mode is established).

If the touch sensor 14 of the shutter-release button 11 is touched at time t1, a signal indicating that the sensor has been touched is input from the touch sensor 14 to the CPU 10. In response, the inverter 7 is controlled by the CPU 10 and controls the backlighting device 6 so as to turn the latter on (i.e., the transmitting mode is established).

If the shutter-release button 11 is pressed by an amount equivalent to the first stroke (i.e., if the switch S1 is closed) at time t2, a signal indicative of this fact is input to the CPU 10. Image data representing the image of the subject is input to the image sensing circuit 2, which proceeds to perform AE control and AWE control. The digital camera is placed in a recording-standby state (time t3) until the shutter-release button 11 is pressed by an amount equivalent to the second stroke (i.e., until the switch S2 is closed).

The image data is supplied from the image sensing circuit 2 to the liquid crystal driver 3 so that the image of the subject obtained by image sensing is displayed on the liquid crystal display panel 5. Since the underside of the liquid crystal display panel 5 is illuminated by light from the backlighting device 6, the image being displayed on the liquid crystal display unit 4 is easy to see.

When the shutter-release button 11 is pressed by an amount equivalent to the second stroke (i.e., when the switch S2 is closed) at time t4, the image data is applied to the recording processing circuit 8 where the data is subjected to recording processing such as data compression and then recorded on the memory card 9.

If the recording of the image data on the memory card 9 ends at time t5, the digital camera returns to the standby mode. Furthermore, the inverter 7 is controlled in such a manner that the backlighting device 6 of the liquid crystal display unit 4 is turned off. The liquid crystal driver 3 is controlled in such a manner that the liquid crystal display unit 4 is placed in the reflecting mode.

In the above-described embodiment, the shutter-release button 11 is provided with the touch sensor 14 and the backlighting device 6 is turned on when the touch sensor 14 is touched. However, it is possible to adopt an arrangement in which the on/off state of the backlighting device 6 is controlled based upon AE information output from the image sensing circuit 2.

If AE information output from the image sensing circuit 2 indicates that the level of the image data is below a predetermined level, it is judged that shooting is taking place indoors. Conversely, if AE information output from the image sensing circuit 2 indicates that the level of the image data is above a predetermined level, it is judged that shooting is taking place outdoors. By turning the backlighting device 6 on when it is determined that shooting is taking place indoors and, moreover, when it is determined by the touch sensor 14 that the shutter-release button 11 has been touched, the liquid crystal display panel 5 can be illuminated by light from the underside thereof. The image being displayed on the display screen of the liquid crystal display unit 4 can thus be easily viewed even during indoor photography. When shooting takes place outdoors, ambient light strikes the front side of the liquid crystal display panel 5 and makes it easy to see the image displayed by the liquid crystal display panel 5. It is preferred that the backlighting device 6 be turned off, even if the shutter-release button 11 is touched, when it is judged that shooting is taking place outdoors. This makes it possible to conserve power. It goes without saying that when it is judged that shooting is taking place indoors, the backlighting device 6 is always turned on if the shutter-release button 11 is touched.

A power-supply voltage sensing circuit 16 may also be provided. If the power-supply voltage sensing circuit 16 senses that power-supply voltage has fallen below a certain value, on/off control of the backlighting device 6 may be performed when the touch sensor 14 is touched or on/off control of the backlighting device 6 may be performed upon determining whether shooting is taking place indoors or outdoors.

Furthermore, there may be provided a mode setting switch 17 that makes it possible to set a first energy conserving mode and a second energy conserving mode. When the first energy conserving mode has been set in this case, the backlighting device 6 is turned on if the touch sensor 14 is touched. When the second energy conserving mode has been set, the backlighting device 6 is turned on, regardless of whether or not the shutter-release button 11 is touched, if it has been determined, based upon the AE information, that photography is being performed indoors.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus, comprising:
   a shutter-release button;
   an image sensing device, responsive to a pressing of said shutter-release button, for sensing an image of a subject and outputting image data representing the image of the subject;
   a reflecting/transmitting-type liquid crystal display unit capable of operating in both reflecting and transmitting modes, which includes a backlighting device in which backlighting can be turned on and off, for displaying the image represented by the image data output from said image sensing device;
   a touch discriminating device for determining whether the shutter-release button has been touched; and
   a backlight emission controller for turning on said backlighting device in response to a determination by said touch discriminating device that said shutter-release button has been touched.

2. The image sensing apparatus according to claim 1, further comprising a shooting-location discriminating device for determining whether a shooting is taking place outdoors or indoors, wherein said backlight emission controller turns on said backlighting device in response to a determination by said shooting-location discriminating device that the shooting is taking place indoors and in response to the determination by said touch discriminating device that said shutter-release button has been touched.

3. The image sensing apparatus according to claim 1, further comprising:
   a power-supply voltage sensing circuit; and
   a control unit for controlling said touch discriminating device in such a manner that the determination by said touch discriminating device is performed in response to said power-supply voltage sensing circuit sensing that a power-supply voltage has fallen below a fixed voltage.

4. The image sensing apparatus according to claim 1, further comprising a touch sensor for detecting a touch, which is formed on a surface of said shutter-release button, wherein said touch discriminating device determines whether said shutter-release button has been touched in response to detecting the touch by said touch sensor.

5. The image sensing apparatus according to claim 1, wherein said backlight emission controller turns off said backlight device in response to the image data outputted from said image sensing device has been recorded on a recording media.

6. The image sensing apparatus according to claim 1, further comprising an ambient light detector configured to determine an amount of ambient light, wherein said backlight emission controller turns on said backlighting device in response to a determination by said ambient light detector that the amount of ambient light is below a preset threshold level and in response to the determination by said touch discriminating device that said shutter-release button has been touched.

7. The image sensing apparatus according to claim 6, wherein said backlight emission controller prevents said backlighting from turning on in response to a determination by said ambient light detector that the amount of ambient light is above the preset threshold level.

8. The image sensing apparatus according to claim 1, further comprising:
   a mode setting switch configured to allow said image sensing apparatus to operate between a first energy conserving mode and a second energy conserving mode; and
   an ambient light detector configured to determine an amount of ambient light,
   wherein in the first energy conserving mode, said backlight emission controller turns on said backlighting device in response to the determination by said touch discriminating device that said shutter-release button has been touched, and wherein in the second energy conserving mode, said backlight emission controller turns on said backlighting device in response to in response to a determination by said ambient light detector that the amount of ambient light is below a preset threshold level.

9. A method of controlling operation of an image sensing apparatus having a shutter-release button, in which an image of a subject is sensed in response to a pressing of the shutter-release button, the method comprising the steps of:

providing a reflecting/transmitting-type liquid crystal display unit capable of operating in both reflecting and transmitting modes, which includes a backlighting device in which backlighting can be turned on and off, for displaying the image represented by an image data obtained by sensing the image of the subject;

determining whether the shutter-release button has been touched; and turning on the backlighting device in response to a determination by said touch discriminating device that said shutter-release button has been touched.

10. The method of claim 9, further comprising:

determining whether a shooting is taking place outdoors or indoors; and turning on the backlighting device in response to a determination the shooting is taking place indoors and in response to the determination that the shutter-release button has been touched.

11. The method of claim 9, further comprising:

sensing a power-supply voltage of the image sensing apparatus; and performing said determining step to determine whether the shutter-release button has been touched when it is sensed that the power-supply voltage has fallen below a preset voltage level.

12. The method of claim 9, further comprising turning off the backlight device in response to the image data outputted from the image sensing device being recorded on a recording media.

13. The method of claim 9, further comprising:

determining an amount of ambient light; and turning on the backlighting device when it is determined that the amount of ambient light is below a preset threshold level and that the shutter-release button has been touched.

14. The method of claim 13, further comprising preventing the backlighting from turning when it is determined that the amount of ambient light is above the preset threshold level.

15. The method of claim 9, further comprising:

determining whether the image sensing apparatus is operating in a first energy conserving mode or a second energy conserving mode;

determining an amount of ambient light;

when in the first energy conserving mode, turning on the backlighting device when it is determined that the shutter-release button has been touched; and wherein in the second energy conserving mode, turning on the backlighting device when it is determined that the amount of ambient light is below a preset threshold level.

* * * * *